United States Patent [19]

Snitzer

[11] Patent Number: 4,782,491
[45] Date of Patent: Nov. 1, 1988

[54] ION DOPED, FUSED SILICA GLASS FIBER LASER

[75] Inventor: Elias Snitzer, Wellesley, Mass.

[73] Assignee: Polaroid Corporation, Cambridge, Mass.

[21] Appl. No.: 36,506

[22] Filed: Apr. 9, 1987

[51] Int. Cl.$^4$ .............................................. H01S 3/30
[52] U.S. Cl. ........................................ 372/6; 372/39; 350/96.15; 350/96.34
[58] Field of Search .................... 372/6, 39, 75, 69–71; 350/96.3, 96.34, 96.15

[56] References Cited

U.S. PATENT DOCUMENTS

| | | | |
|---|---|---|---|
| 3,242,440 | 3/1966 | Koester et al. | 331/94.5 |
| 3,355,674 | 11/1967 | Hardy | 331/94.5 |
| 3,395,366 | 7/1968 | Snitzer et al. | 331/94.5 |
| 3,808,549 | 4/1974 | Maurer | 331/94.5 |
| 3,826,992 | 7/1974 | Friedl | 330/4.3 |
| 3,961,283 | 6/1976 | Abrams et al. | 331/94.5 |
| 3,974,454 | 8/1976 | Sturel | 330/4.3 |
| 4,040,890 | 8/1977 | Burrus, Jr. et al. | 156/605 |
| 4,515,431 | 5/1985 | Shaw et al. | 350/96.15 |
| 4,546,476 | 10/1985 | Shaw et al. | 372/6 |
| 4,553,238 | 11/1985 | Shaw et al. | 372/6 |
| 4,637,025 | 1/1987 | Snitzer et al. | 372/6 |
| 4,680,767 | 7/1987 | Hakimi et al. | 372/6 |
| 4,682,335 | 7/1987 | Hughes | 372/6 |

FOREIGN PATENT DOCUMENTS 0208189  1/1987  European Pat. Off. ............... 372/6

OTHER PUBLICATIONS

"Theoretical Analysis of Optical Fiber Laser Amplifiers and Oscillators" M. J. F. Digonnet & C. J. Gaeta, Applied Optics, Feb. 1, 1985, vol. 24, No. 3.

Primary Examiner—Leon Scott, Jr.
Attorney, Agent, or Firm—Francis J. Caufield

[57] ABSTRACT

An optical fiber laser comprising a nearly pure fused silica glass, neodymium doped active core within a cavity in the form of a single mode optical fiber. The gain cavity is end pumped at a nominal wavelength of 0.8 microns and its length and neodymium concentration are adjusted to maximize pump absorption and minimize concentration quenching. Dichroic mirrors are preferably integrally formed on ends of the cavity and have reflection characteristics selected so that the laser has an output at a nominal wavelength of 1.06 microns.

16 Claims, 1 Drawing Sheet

ION DOPED, FUSED SILICA GLASS FIBER LASER

FIELD OF THE INVENTION

The present invention relates to glass lasers and amplifiers and, in particular, to a neodymium doped, end pumped, substantially pure fused silica glass fiber laser and/or amplifier.

BACKGROUND OF THE INVENTION

Neodymium doped, end pumped, substantially pure fused silica glass (hard glass) fiber lasers and/or amplifiers have been considered previously in the art. However, due to the inability of those skilled in the art to provide appropriately high concentrations of neodymium doped hard glass, an optimal design for this type of laser and/or amplifier has not been found.

For practical reasons, it is desirable that the length of the glass fiber for such lasers and/or amplifiers not be excessively long nor too short to handle. In particular, it is desirable to fabricate a laser and/or amplifier having a relatively short fiber and having a high enough concentration of neodymium so that substantially all the incident pump light focused on an end is absorbed in one or, at most, two passes through the fiber. More specifically, if the apparatus is used as a laser, substantially all of the incident pump radiation should be absorbed in one or two passes through the fiber, whereas if the apparatus is used as an amplifier, substantially all of the incident pump radiation should be absorbed in a single pass through the fiber.

However, there is a practical upper bound on the neodymium concentration which is dictated by factors other than difficulty of fabrication. In practice, the neodymium concentration is limited because a high concentration leads to concentration quenching, concentration quenching being the physical phenomenon where non-radiative decays occur from an excited state. In neodymium doped glass fibers, concentration quenching occurs as a result of the interaction of active neodymium ions with each other.

Concentration quenching is undesirable because it, in effect, decreases the amount of pump power available to drive the laser and/or amplifier. This results in a decrease in quantum efficiency for fluorescence and directly relates to a decrease in the performance of the laser and/or amplifier. In other words, concentration quenching acts as if the pump power that was available from the pump source has been decreased by an amount which is equivalent to the decrease in the fluorescence efficiency of the laser and/or amplifier.

While the effective decrease in fluorescence efficiency caused by concentration quenching is seen to cause an effective decrease in the power efficiency of the pump source, it is important for another reason. This reason is that the power efficiency of the pump source determines how much input power is required of the pump and, therefore, determines certain heat dissipation requirements. Poor efficiency means higher input power requirements for a given optical power output. In general, this can present power supply problems for remotely located equipment. Further, inefficiently converted pump energy results in heating which requires appropriate heat dissipation arrangements which would otherwise be unnecessary.

In light of the above, a need exists for an efficient, high concentration, neodymium ion doped, end pumped, substantially pure fused silica glass fiber laser and/or amplifier.

SUMMARY OF THE INVENTION

An embodiment of the present invention provides an optimally designed, high concentration neodymium ion doped, end pumped, nearly pure fused silica glass fiber laser and/or amplifier. More specifically, the present invention provides such a laser and/or amplifier which is pumped substantially at 0.8 microns and whose output is substantially at 1.06 microns and/or 1.35 microns.

The laser and/or amplifier of the present invention comprises an optical gain cavity in the form of a single mode optical fiber in which the laser gain or active material, trivalent neodymium, is present as neodymium oxide doped, nearly pure fused silica (hard glass) in the fiber core. More specifically, the glass is doped with a sufficiently high concentration of $Nd_2O_3$ that approximately 95% or more of the incident pump power is absorbed within the fiber in a single or double pass therethrough, as dictated by the intended use. Further, the concentration is chosen to be low enough that concentration quenching lowers the fluorescence absorption efficiency by no more than 10%. As described below, these requirements in practice means limiting the concentration to be less than 1 to 2 weight percent of $Nd_2O_3$ so that concentration quenching be less than or approximately equal to 10% and requiring the product of concentration, d, and length, l, of traversal of the pump light through the fiber (the concentration being given in weight percent and the length being given in cm), to be approximately equal to or greater than 3.24 so that the efficiency for the absorption of pump light be at least 95%. In fabricating the inventive apparatus, the concentration at which concentration quenching lowers the flourescence efficiency by less than 10% is experimentally determined in accordance with the methods described hereinbelow.

Further, in a preferred embodiment of the inventive apparatus, the source of the pump radiation is a laser diode comprising an alloy of GaAlAs with an output wavelength substantially at 0.8 microns.

BRIEF DESCRIPTION OF THE DRAWING

A complete understanding of the present invention may be gained by considering the following detailed description in conjunction with the accompanying drawing, in which.

DETAILED DESCRIPTION

Figure 1:
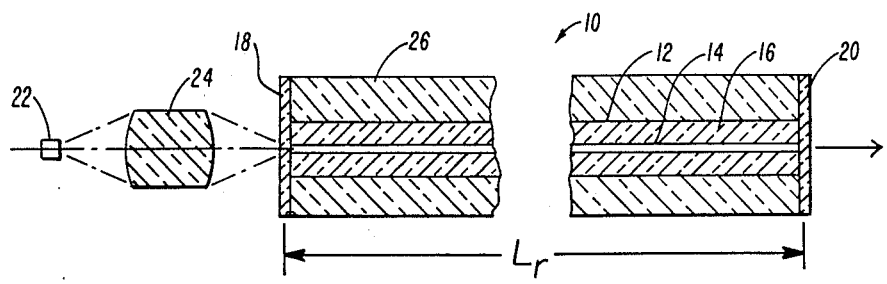
FIG. 1 shows, in pictorial form, an embodiment of the laser system of the present invention.

FIG. 1 shows an embodiment of the inventive laser and/or amplifier which is designed generally as 10. The major components of laser 10 are a gain cavity in the form of a single mode optical fiber 12 which comprises a core 14 surrounded by a cladding 16. Dichroic filter 18 is at the left end of optical fiber 12 and dichroic filter 20 is at its right end, both filters being preferably integrally formed in optical contact with the ends of optical fiber 12. Dichroic filters 18 and 20 are fabricated in a manner well-known to those of ordinary skill in the art to provide specific reflection and transmission properties which are described below. Dichroic filters 18 and 20 provide feedback for lasing action and/or amplification and at the same time permit end pumping of core 14.

In FIG. 1, optical fiber gain cavity 12 is a single mode fiber having a circular configuration. As such, its geometry and material parameters are selected to satisfy the well-known relation:

$$2\pi a/\lambda \, (n_{14}^2 - n_{16}^2)^{\frac{1}{2}} < 2.405 \qquad (1)$$

where a=core radius, $\lambda$ is the wavelength, $n_{14}$ and $n_{16}$ are the core and cladding indices of refraction, respectively, and 2.405 is a constant whose value is the $0_{th}$ order Bessel function at the first root. Since the wavelength region of most interest is in the near infrared where optical fiber transmission attenuation is small, the diameter of core 14 is on the order of a few microns, more or less, while that of cladding 16 can be conveniently made larger and will be in the range of about 80 to 100 microns. In other embodiments, the cross section of core 14 and cladding 16 can be non-circular and still be single mode propagating, but in this case, eqn. (1) is only approximately true and is to be applied accordingly.

Core 14 is nearly pure fused silica which has been doped uniformly throughout with a predetermined concentration of active trivalent neodymium ions ($Nd^{3+}$) in the form of neodymium oxide ($Nd_2O_3$). Optical fiber 12 is fabricated in accordance with a method disclosed in a commonly assigned patent application entitled "Method For Fabricating Optical Fibers Having Cores With High Rare Earth Content" filed concurrently with this application and having Ser. No. 07/036,505.

Figure 2:
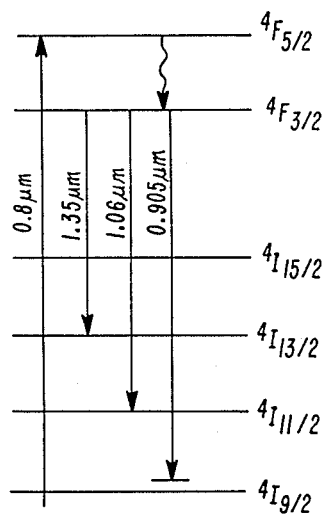
FIG. 2 shows, in pictorial form, a typical energy level diagram for trivalent neodymium in a host of substantially pure fused silica.

FIG. 2 shows a typical energy level diagram for trivalent neodymium in a host of pure fused silica. As such, FIG. 2 shows that a laser system having a nominal wavelength of 1.06 microns or 1.35 microns is a four level system. Thus, the lasing action, we need to excite the upper state population only enough to provide sufficient gain to overcome cavity losses.

Energy from pump source 22 is coupled into the left end of core 14 through dichroic filter 18 by way of a bulk optical arrangement designated generally as 24. It is important for the primary emission spectrum of pump 22 to have at least one line at one of the primary absorption lines of neodymium ions in glass. The pump source can be a krypton ion laser but is preferably a laser diode. Laser diode 22 is preferably of the type which comprises an alloy of gallium aluminum arsenide having a spectral output at approximately 0.8 microns, an emission restricted to a wavelength interval of less than 100 anstroms and occurring at one of the peak absorption bands for the neodymium ions in the glass. Alternatively, absorption bands of neodymium ions substantially at 0.74 microns and substantially at 0.88 microns can be used with suitable pump sources at these wavelengths. The absorption band at 0.8 microns is preferred because of the availability of reliable laser diodes at this wavelength.

The output power level of laser diode 22 is regulated by controlling its injection current and bulk optics 24 is chosen to match the numerical aperture (NA) of laser diode 22 to the NA of optical fiber 12. The NA of fiber 12 typically ranges from a low value of approximately 0.03 to a high value of approximately 0.3. Thus, laser diode 22 and bulk optical arrangement 24 provide means to controllably and couple energy into fiber core 12 to cause the required population inversion above threshold to provide lasing action in the cavity.

Cladding 16 is pure fused silica and core 14 is nearly pure fused silica. The indices of refraction satisfy the following formula:

$$(n_{14}^2 - n_{16}^2)^{\frac{1}{2}} = NA(\text{fiber } 12) \qquad (2)$$

Since $n_{14}$ is approximately equal to $n_{16}$, eqn. (2) can be rewritten so that $2n_{16}(deln)$ is approximately equal to $NA^2$, where deln is ($n_{14}-n_{16}$). Since NA typically ranges from 0.03 to 0.3 and $n_{16}$ is approximately equal to 1.5, deln is approximately equal to 0.03 for a high NA fiber and deln is approximately equal to 0.0003 for a low NA fiber. Thus, this determines the range of difference in index of refraction between the pure fused silica of cladding 16 and the nearly pure fused silica of core 14. In addition, for reliability, the impurities which provide the difference in the index of refraction between core 14 and cladding 16 should be constrained by the requirement that the thermal coefficient of expansion of core 14 be substantially equal to that of cladding 16.

As in other resonant cavity structures, the length, $L_r$, also determines the frequency or wavelength of the resonances supported in the cavity and is an integral number N of half-wavelengths, i.e., $L_r=(N\lambda)/(2n_e)$, where $\lambda$ is the free space wavelength and $n_e$ is the effective index of refraction of core 14 at the resonant mode.

To assist in fabricating dichroic filters 18 and 20, the optical fiber laser is placed inside glass capillary tube 26 and is potted there to remain fixed in place. The ends of tube 26, along with optical fiber 12, are ground and polished, and filters 18 and 20 are then formed on the polished ends in any well-known manner, such as by vapor deposition. In this way, capillary tube 26 aids in the fabrication of filters 18 and 20 and provides a means for easily handling laser 10. The outside diameter of capillary tube 26 is several millimeters, or more, for convenience. Alternatively, fiber 12 can be made with an oversized cladding, say within the range between 0.5 and 5.0 millimeters outside diameter, so that it is self supporting and does not require a capillary tube. This avoids the need for a buffer coating to avoid breakage. Here, the end surfaces can be ground and polished perpendicular to the core to get good, efficient end reflections, and the rod can be put in a vacuum sputterer or evaporator for deposition of end coatings without the problems of outgasing from the buffer coating or an epoxy used to hold a small (<200 micrometers) in a capillary tube.

Regarding the doping of core 14, it is advantageous to push the concentration of the neodymium as high as possible to make a short laser, as long as the concentration is restricted to an amount below the onset of concentration quenching. Specifically, the glass is doped with a sufficiently high concentration of $Nd_2O_3$ that approximately 95% or more of the incident pump power is absorbed within the fiber in a single or double pass therethrough, as dictated by the intended use, as is set forth in detail below. Further, the concentration is chosen to be low enough that concentration quenching lowers the flourescence absorption efficiency by no more than 10%. As described below, this means limiting the concentration to be not more than 1 to 2 weight percent of $Nd_2O_3$ so that concentration quenching not be more than 10% and requiring the product of concentration c and length 1 of traversal of the pump light through the fiber (the concentration being given in weight percent and the length being given in cm), to be equal to 3.24 so that the efficiency for the absorption of pump light be at least 95%. The concentration for absorption of at least 95% of the pump radiation is determined in accordance with the following discussion.

I have experimentally measured the transmission of pump light through silica glass having a given concentration of $Nd_2O_3$. The transmission, T, is given by the following equation:

$$T = e^{-clb} \quad (3)$$

where c is the weight percent concentration of $Nd_3O_3$, l is the length of the glass, and b is an absorption. coefficient per concentration and per unit length of the material. Experimentally, I have determined that pump light at 0.8 microns is attenuated by a factor of 2 for a concentration of 0.5 weight percent when $l = 1.5$ cm. This is used to determine that $b = 0.924$, i.e., $e^{-(0.5)(1.5)b} = 0.5$ gives $b = 0.924$.

Equation 3 therefore gives an inverse relationship between concentration and length and shows that for 95% absorption of the end pumped radiation at 0.8 microns, the product of the concentration c and the length l should be equal to 3.24 in order to obtain at least 95% absorption of the incident pump light, i.e., $e^{-cl(0.924)} = 0.05$ from eqn. 3; when solved gives $cl = 3.24$. In particular, then, if core 14 has a concentration of 1.0 weight percent $Nd_2O_3$, fiber 12 should be at least 3.24 cm long in order to absorb at least 95% of the incident pump light. For a concentration of 0.2 weight percent $Nd_2O_3$, the length should be at least equal to 16.2 cm for an efficiency of absorption of the pump light in excess of 95%. As concentration is further reduced, core 14 increases in length. For many applications this introduces an undesirably excessive length for the device.

The above-described experimental results were obtained in a bulk sample of nearly pure fused silica glass. However, the inventive apparatus employs a single mode fiber core of this material. It is well-known that for a single mode, an appreciable portion of the light incident on the fiber propagates in the cladding. The effect is to provide an effective absorption coefficient b which is less than that provided by measurements in the bulk material. In order to compensate for this one need merely increase the length of fiber 12 in order to assure absorption of at least 95% of the pump radiation in one or two passes through the fiber, respectively, in accordance with specific designs discussed below.

The point at which the onset of concentration quenching occurs is determined in accordance with the following discussion. Let $A_{rad}$ be the total radiative transition probability from a particular upper state to all of the lower states. Then the radiative lifetime, $t_{rad}$, is the inverse of $A_{rad}$. Let $A_{non-rad}$ be the total non-radiative transition probability from the upper state to all of the lower states. Then the experimentally measured lifetime, $t_{meas}$, is the inverse of $A_{rad} + A_{non-rad}$ and the efficiency for fluorescence is given by:

$$Eff. = A_{rad}/(A_{rad} + A_{non-rad}) \quad (4)$$

If we assume that the lifetime at low concentration is due only to radiative processes, then the shortening of the lifetime as the concentration increases provides a direct measure of the non-radiative transition probability relative to the radiative transition probability and, hence, a direct indication of efficiency. Thus, the measured lifetime with concentration quenching, $t_{meas-con}$, is given in terms of the measured lifetime without concentration quenching, $2t_{meas-no-con} = 1/A_{rad}$, as follows:

$$t_{meas-con} = 1/(1/t_{meas-no-con} + A_{non-rad}) \quad (5)$$

Rearranging eqn. (4) provides:

$$A_{non-rad} = A_{rad}(1-Eff.)/Eff. \quad (6)$$

Substituting from eqn. (6) in eqn. (5), we obtain:

$$Eff. = t_{meas-con}/t_{meas-no-con} \quad (7)$$

Thus, the concentration at which the onset of concentration quenching occurs may be determined experimentally by measuring the transition lifetime of fluorescence. This is done, in a manner well known to those of ordinary skill in the art, by measuring the intensity versus time of fluorescence emission of, for example, 1.06 micron radiation.

Specifically, the onset of concentration quenching is determined by measuring the 1/e lifetime of fluorescence in $Nd_2O_3$ doped nearly pure fused silica glass, at various concentrations of $Nd_2O_3$. For example, I measured 1/e lifetime of 420, 380 and 280 microseconds for weight concentrations of 0.5 to 1.0, and 2.6 percent, respectively. As discussed above, the shortening of the lifetime is evidence of concentration quenching. For example, this data indicates that going from 0.5 weight percent to 1.0 weight percent of $Nd_2O_3$ for shortened the lifetime of fluorescence by approximately 10%, from 320 microseconds to 380 microseconds. This implies that there has been a decrease in efficiency for fluorescence due to concentration quenching of approximately 10%.

Depending on the nature of the device, the length l could either be the length of the device between filters 18 and 20 or it could be double that length. Assume in a first case that we have an amplifier that emits at 1.06 microns. In an amplifier, only one pass is made through fiber 12. As a result, the length l used in the equations is the physical length of the fiber 12 and suitable reflectivities for filters 18 and 20 are given in Table I.

Assume in a second case that we have a laser that emits at 1.06 microns and that pump light at 0.8 microns is making two passes through fiber 12, i.e., the pump light propagates from reflector 18 to reflector 20 and back again. IN this case, the length l that is appropriate to use in the equations which relate to the concentration in order to achieve a certain absorption efficiency, for example, 95% efficiency, is twice the physical length of fiber 12 because of the two passes. Further, suitable reflectivities for filters 18 and 20 for this design are given in Table II. As seen in Table II, filter 20 should have a high value of reflectivity at both 1.06 and at 0.8 microns.

The reflectivities of dichroic filters 18 and 20 are set forth in approximate fashion in Table I and II, for a single pass and a double pass design, respectively.

TABLE I

| | Single Pass Design | |
|---|---|---|
| | .8 microns | 1.06 microns |
| $R_{filter}$ 18 | <20% | 99% |
| $R_{filter}$ 20 | irrelevant | 98% |

TABLE II

| | Double Pass Design | |
|---|---|---|
| | .8 microns | 1.06 microns |
| $R_{filter}$ 18 | <20% | 99% |
| $R_{filter}$ 20 | >95% | 98% |

The reflectivity of filter 18 is low at 0.8 microns in both designs to permit the maximum amount of pump light to pass through it and into the fiber.

Of course, by reference to FIG. 2, one sees that his apparatus could readily operate also at an output wavelength substantially equal to 1.35 microns. This occurs when one substitutes the reflectivites at 1.35 microns for those at 1.06 microns in the above.

Clearly, those skilled in the art recognize that further embodiments of the present invention may be made without departing from its teachings. Therefore, it is intended that all matter contained in the above description or shown in the accompanying drawings shall be interpreted as illustrative and not limiting.

What is claimed is:

1. An optical fiber laser comprising:
a gain cavity formed of a length of single mode optical fiber having a core with a given index of refraction and a cladding that surrounds said core and has an index of refraction lower than that of said core, said core being fabricated predominantly of fused silica into which there is uniformly incorporated a predetermined concentration of neodymium ions, said length of said gain cavity and the concentration of said neodymium ions being in accordance with the expression:

$$e^{-clb} < \text{or} = \text{approx. } 0.05,$$

where c is said predetermined concentration of said neodymium ions and is less than 2 weight percent, l is twice the length of said fiber, and b is the effective absorption coefficient for light travelling in said core at at least one of its absorption bands whereby said core will absorb in a double pass 95% of any light travelling through it that is within said at least one absorption band thereof with concentration quenching lowering its fluorescence absorption efficiency in said at least one absorption band thereof by no more than approximately 10% where the fluorescence absorption efficiency is understood to means the ratio of the total radiative transition probability from a particular upper state to all lower states of said core to the sum of the radiative and non-radiative probabilities from the upper state to all of the lower states of said core;
reflection means optically coupled to each end of said gain cavity for providing feedback to said cavity at at least one emission line of said neodymium ions in said predominantly fused silica core and for permitting pumping energy to be introduced into said gain cavity core at said at least one absorption band of said neodymium ions in said predominantly fused silica core; and
means for pumping energy into said gain cavity core through one end thereof at said at least one absorption band thereof so that said gain cavity oscillates substantially at said at least one emission line,
said optical fiber laser being thus structured for optimal utilization of pump energy.

2. The optical fiber laser of claim 1 wherein the light provided by said pumping means is substantially at 0.8 microns and cl is greater than or substantially equal to 3.24.

3. The laser of claim 1 wherein the source of pump radiation provides pump radiation substantially at at least one of 0.74 microns, 0.8 microns, or 0.88 microns.

4. The optical fiber laser of claim 3 wherein said means for pumping energy is a laser diode comprising an alloy of GaAlAs having an output wavelength substantially at 0.8 microns.

5. The optical fiber laser of claim 3 wherein said means for pumping energy is a krypton ion laser.

6. The optical fiber laser of claim 3 wherein said gain cavity oscillates substantially at 1.06 microns or substantially at 1.35 microns.

7. The optical fiber laser of claim 3 wherein said reflection means comprises:
a first dichroic filter having a low reflection coefficient for the pump radiation in the at least one absorption band and a high reflection coefficient for the at least one mission line; and
a second dichroic filter having a high reflection coefficient for the pump radiation in the at least one absorption band a high reflection coefficient for the at least one emission line.

8. The optical fiber laser of claim 1 wherein said cladding is circular having an outside diameter within the range between 0.5 and 5 millimeters.

9. An optical fiber amplifier comprising:
a gain cavity formed of a length of single mode optical fiber having a core with a given index of refraction and a cladding that surrounds said core and has an index of refraction lower than that of said core, said core being fabricated predominantly of fused silica into which there is uniformly incorporated a predetermined concentration of neodymium ions, said length of said gain cavity and the concentration of said neodymium ions being in accordance with the expression:

$$e^{-clb} < \text{or} = \text{approx. } 0.05,$$

where c is said predetermined concentration of said neodymium ions and is less than 2 weight percent, l is the length of said fiber, and b is the effective absorption coefficient for light travelling in said core at at least one of its absorption bands whereby said core will absorb in a double pass 95% of any light travelling through it that is within said at least one absorption band thereof with concentration quenching lowering the fluorescence absorption efficiency in said at least one absorption band thereof by no more than approximately 10% where the fluorescence absorption efficiency is understood to mean the ratio of the total radiative transition probability from a particular upper state to all lower states of said core to the sum of the radiative and non-radiative probabilities from the upper state to all of the lower states of said core;
reflection means optically coupled to each end of said gain cavity for providing feedback in said cavity at at least one emission line of said neodymium ions in said predominantly fused silica core and for permitting pumping energy to be introduced into said gain cavity core at said of least one absorption band of said neodymium ions in said predominantly fused silica core; and
means for pumping energy into said gain cavity core through one end thereof at said at least one absorption band thereof so that said gain cavity oscillates substantially at said at least one emission line, said optical fiber amplifier being thus structured for optimal utilization of pump energy.

10. The optical fiber amplifier of claim 10 wherein the light provided by said pumping means is substantially at 0.8 microns and cl is greater than or substantially equal to 3.24.

11. The optical fiber amplifier of claim 9 wherein the source of pump radiation provides pump radiation substantially at at least one of 0.74 microns, 0.8 microns, or 0.88 microns.

12. The optical fiber fiber amplifier of claim 11 wherein said means for pumping energy is a laser diode comprising an alloy of GaAlAs having an output wavelength substantially at 0.8 microns.

13. The optical fiber amplifier of claim 11 wherein said means for pumping energy is a krypton ion laser.

14. The optical fiber amplifier of claim 11 wherein said gain cavity oscillates substantially at 1.06 microns or substantially at 1.35 microns.

15. The optical fiber amplifier of claim 11 wherein said reflection means comprises:
a first dichroic filter having a low reflection coefficient for the pump radiation in the at least one absorption band and a high reflection coefficient for the at least one emission line; and
a second dichroic filter having a high reflection coefficient for the at least one emission line.

16. The optical fiber amplifier of claim 9 wherein said cladding is circular having an outside diameter within the range between 0.5 and 5 millimeters.

* * * * *